United States Patent
Walker et al.

(10) Patent No.: US 6,530,986 B2
(45) Date of Patent: Mar. 11, 2003

(54) PIGMENT INK SET

(75) Inventors: Nicholas Alexander Walker, Goostrey (GB); Peter Edward Rose, Winsford (GB)

(73) Assignee: Ilford Imaging UK Limited (GB)

( * ) Notice: Subject to any disclaimer, the term of this patent is extended or adjusted under 35 U.S.C. 154(b) by 0 days.

(21) Appl. No.: 09/965,044

(22) Filed: Sep. 27, 2001

(65) Prior Publication Data

US 2002/0043175 A1 Apr. 18, 2002

(30) Foreign Application Priority Data

Sep. 29, 2000 (GB) .............................................. 0023838

(51) Int. Cl.$^7$ .............................................. C09D 11/02

(52) U.S. Cl. .................. 106/31.6; 106/31.9; 106/31.78; 106/31.75

(58) Field of Search ............................... 106/31.6, 31.9, 106/31.78, 31.75

(56) References Cited

U.S. PATENT DOCUMENTS

| | | |
|---|---|---|
| 4,597,794 A | 7/1986 | Ohta et al. |
| 4,872,916 A | 10/1989 | Latoshky |
| 5,026,427 A | 6/1991 | Mitchell et al. |
| 5,085,698 A | 2/1992 | Ma et al. |
| 5,172,133 A | 12/1992 | Suga et al. |
| 5,651,813 A | 7/1997 | Santilli et al. |
| 5,707,433 A | 1/1998 | Kuge et al. |
| 5,734,800 A | 3/1998 | Herbert et al. |
| 5,821,283 A | 10/1998 | Hesler et al. |
| 5,837,043 A | 11/1998 | Wong et al. |
| 5,858,075 A | 1/1999 | Deardurff et al. |
| 5,985,017 A | 11/1999 | Bugner et al. |
| 6,043,297 A | 3/2000 | Sano |
| 6,117,606 A | 9/2000 | Macholdt et al. |
| 6,152,999 A | 11/2000 | Erdtmann et al. |
| 6,153,000 A | 11/2000 | Erdtmann et al. |

FOREIGN PATENT DOCUMENTS

| | | |
|---|---|---|
| EP | 0776953 A2 | 6/1997 |
| EP | 0819738 A2 | 1/1998 |
| EP | 0826752 A2 | 3/1998 |
| EP | 0848045 A1 | 6/1998 |
| EP | 0933406 A1 | 8/1999 |
| EP | 0992551 A2 | 4/2000 |
| EP | 1045013 A1 | 10/2000 |
| GB | 2348433 A | 10/2000 |

OTHER PUBLICATIONS

H. Wilhelm "The Permanence and Care of Color Photographs" pp. 91 and 92, No date available.

Colour Index International Pigments and Solvent Dyes; Title and index pages, 1997 No month available.

W.Bauer, R. Baur, J.Geisenberger, H–T. Macholdt, and W. Zoeller Colorants for Electrophotography and Inkjet, Jun. 1999.

*Primary Examiner*—Helene Klemanski
*Assistant Examiner*—Veronica F. Faison
(74) *Attorney, Agent, or Firm*—Onofrio Law; Dara L. Onofrio, Esq.

(57) ABSTRACT

There is provided a pigmented aqueous ink set which comprises:
- (a) a cyan ink which comprises at least one pigment which is a phthalocyanine compound;
- (b) a magenta ink which comprises at least one pigment which is a quinacridone compound;
- (c) a yellow ink wherein the pigment is C.I. Pigment Yellow 155;
- (d) a green ink wherein the pigment is selected from the group consisting of C.I. Pigment Green 7, 36, and mixtures thereof;
- (e) an orange ink wherein the pigment is selected from the group consisting of C.I. Pigment Orange 34, 36, 43, 61, 64, 71, and mixtures thereof; together with optionally
- (f) a black ink which comprises a black pigment.

Preferably there is also present at least one water soluble organic cosolvent. The pigmented ink set is suitable for use in ink jet printing.

14 Claims, 1 Drawing Sheet

PIGMENT INK SET

FIELD OF THE INVENTION

This invention relates to an aqueous pigmented color ink set and to the use thereof in ink jet printers.

BACKGROUND OF THE INVENTION

Ink jet printing is a non-impact method that in response to a digital signal produces droplets of ink that are deposited on a substrate such as paper or transparent film. Ink jet printing has found broad application in industry as well as for output from personal computers in the office and the home. There are several classes of ink jet printer, for instance thermal drop-on-demand printers, piezo drop-on-demand printers, and continuous ink jet printers.

Ink jet printers, particularly those for use in the home or office, generally use aqueous inks, and such inks commonly employ dyes as colorants. For multi-color printing utilizing the subtractive primary colors it is common to provide three or four separate inks comprising a yellow ink, a magenta ink, a cyan ink, and optionally a black ink. However the use of ink sets comprising more than four colors is known. For example M. Waters in American Ink Maker, November 1988, describes a process in which an increase in color gamut of 50% is achieved by using a six-color dyed ink set compared with a four-color dyed ink set, and U.S. Pat. No. 5,734,800 describes the preparation of a six-color ink set using dye-based inks, some of which may also contain fluorescing agents. It was shown that use of a six-color process system enabled reproduction of a greater range of colors than use of a four-color process system.

The correct choice of dyes for use in such inks is important for good color gamut and image quality. The book "The permanence and care of color photographs" by H. G. Wilhelm published in 1993 by Preservation Publishing Company, Grinnell, Iowa describes on pages 91 and 92 that color imbalance is usually a more important criterion for determining the usable display lifetime of prints than neutral fading. Thus although good lightfastness of the dyes used in ink jet printing is important, it is also important that all the dyes fade at roughly the same rate, because changes in color balance are more readily detectable by eye than an even fading of all colors. For instance U.S. Pat. No. 5,858,075 discloses a dye set useful for ink jet inks comprising a particular combination of yellow, magenta, and cyan dyes. Images produced with the dye set disclosed in U.S. Pat. No. 5,858,075 have lightfast characteristics necessary to preserve the trueness of the inkjet images by (1) producing images having less light fade and (2) images that when they do fade, fade in a more uniform manner across the color set. There is considerable interest in the use of pigmented inks for ink jet printing. The term pigment describes a colorant, which is substantially insoluble in the aqueous ink medium. Various classes of pigment are catalogued and classified in the Pigments and Solvent Dyes section of the Colour Index International, published by the Society of Dyers and Colourists in 1997, and there are additionally numerous other insoluble colored compounds which are not included in the Colour Index. It is expected that pigmented inks will display improved fastness to washing and weathering of the prints produced and better light stability on outdoor exposure than those based on other colorants. However it is well known that it is difficult to match the color gamut of a dye-based ink set with pigmented inks.

European Patent Application 0 933 406 A discloses the use of a six-color ink set in which the colorants are cyan, magenta, yellow, green, orange and black pigments. The orange pigment is selected from CI Pigment Orange 43 and/or 36, the green pigment is selected from CI Pigment Green 7 and/or 36, the blue pigment is CI Pigment Blue 15:3, the magenta pigment is CI Pigment Red 122, 202, or 209, the yellow pigment is selected from CI Pigment Yellow 109, 110, 74 or 138, and the black pigment is Carbon Black. The use of additional pigmented inks, namely orange and/or green inks, achieves color reproduction equal to dye-based inks.

A need still exists for a pigmented ink set with extended color gamut for multicolor ink jet printing which will print successfully through an ink jet printer to provide good quality images of excellent light stability which fade in a more uniform manner when exposed to light and provides excellent color gamut, without introducing other disadvantages.

We have devised a pigmented color ink set which is particularly suitable for ink jet use.

SUMMARY OF THE INVENTION

In the present invention, these purposes, as well as others which will be apparent, are achieved generally by providing a pigmented aqueous ink set which comprises:

(a) a cyan ink which comprises at least one pigment which is a phthalocyanine compound;

(b) a magenta ink which comprises at least one pigment which is a quinacridone compound;

(c) a yellow ink wherein the pigment is C.I. Pigment Yellow 155;

(d) a green ink wherein the pigment is selected from the group consisting of C.I. Pigment Green 7, 36, and mixtures thereof;

(e) an orange ink wherein the pigment is selected from the group consisting of C.I. Pigment Orange 34, 36, 43, 61, 64, or 71, and mixtures thereof; together with optionally (f) a black ink which comprises a black pigment.

Preferably there is also present at least one water soluble organic cosolvent. The pigmented ink set is suitable for use in ink jet printing. Other objects, features, and advantages of the present invention will become apparent from the following detailed description of the invention when considered with reference to the drawings, as follows:

DETAILED DESCRIPTION OF THE INVENTION

Figure 1:
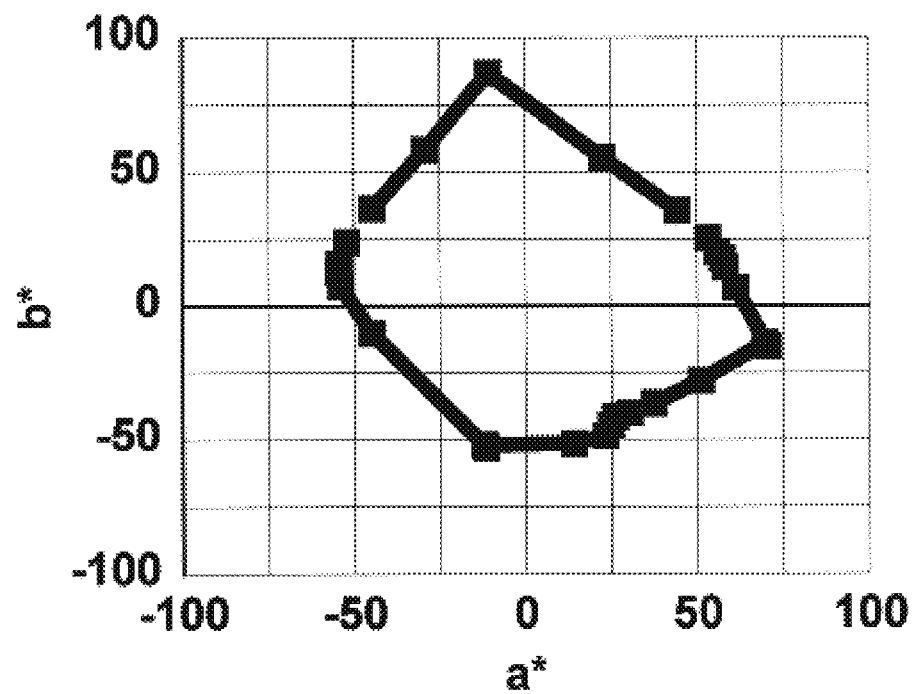
FIG. 1 illustrates the color gamut plot of the comparative ink set from Example 1.

According to the invention there is provided a five color pigmented aqueous ink set, including Pigment Yellow 155. Additionally, a black ink may also be included with the ink set. Pigments are referred to herein according to their designations as shown in the Colour Index.

Suitable phthalocyanine compounds for the cyan ink include CI Pigment Blue 15:3, 15:4, 16, 76, and 79, of which Pigment Blue 15:3 and 15:4 are preferred. Suitable quinacridone compounds for the magenta ink include CI Pigment Violet 19 and Pigment Red 122, 202, 207, and 209, of which Pigment Red 122 is preferred. It is also possible to use mixtures and mixed crystals of such pigments in the magenta ink. Of the orange pigments, C.I. Pigment Orange 43 and 71 are preferred and of the green pigments, C.I. Pigment Green 7 is preferred. A preferred black pigment is Carbon Black. Use of C.I. Pigment Yellow 155 in ink jet inks is known according to European Patent Application 0 908 789 A.

By aqueous ink is meant an ink in which the solvent is predominantly water, but which may include in addition a proportion of at least one water miscible organic cosolvent. The aqueous ink set of the invention is especially suited to use in ink jet printers, particularly thermal ink jet printers. According to this aspect it is preferred that there is at least one organic cosolvent present in the ink, and most preferred that there is a combination of cosolvents present in the ink. Representative examples of water-soluble organic solvents that may be selected include:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) ketones or ketoalcohols such as acetone, methyl ethyl ketone and diacetone alcohol;

(3) ethers, such as tetrahydrofuran, dioxolane and dioxane;

(4) esters, such as ethyl lactate, (5) polyhydric alcohols, such as ethylene glycol, propylene glycol, glycerol, 1,2-hexanediol, 1,5-pentanediol, 2-methyl-2,4-pentanediol, 1,2,6-hexanetriol, trinmethylol ethane, trimethylol propane, and neopentyl glycol;

(6) poly(ethylene oxides) and lower alkyl mono-or di-ethers derived therefrom such as ethylene glycol mono butyl ether, diethylene glycol mono butyl ether, triethylene glycol mono butyl ether, propylene glycol mono methyl (or -ethyl) ether, diethylene glycol di methyl (or -ethyl) ether, diethylene glycol, triethylene glycol, tetraethylene glycol and polyethylene glycols in the molecular weight range up to about 1000;

(7) nitrogen containing organic compounds such as urea, pyrrolidone, N-methyl-2-pyrrolidone, and 1,3-dimethyl-2-imidazolidinone; and (8) sulphur-containing compounds such as dimethyl sulphoxide, thiodiglycol, and sulpholane.

The water miscible organic cosolvent may be present in a proportion of up to about 50% by weight, but is preferably present at between about 5% and about 50%, and most preferably between about 10% and about 25% by weight. It is most preferred that there is a combination of two or three water miscible organic cosolvents present in the ink and that the concentration of each of these is between about 5% and about 10% by weight. The inks of the inventive ink set may also contain other components which are advantageously added to aqueous inks, such as surfactants, viscosity modifiers, biocides, and metal sequestering agents such as EDTA. Such additional components are well known in the art.

According to another aspect of the invention each pigment for the ink set is provided in the form of a fine dispersion in the presence of one or more dispersants or surfactants to stabilize the pigment particles. Suitable dispersants for aqueous ink jet inks are well known in the art, and include macromolecular polyionic dispersants, for example polyester ionomers such as those disclosed in European Patent Application 0 776 953 A and U.S. Pat. No. 4,597,794; acrylate polymers, for example copolymers of styrene with acrylic or maleic acids such as those disclosed by U.S. Pat. Nos. 5,085,698, 5,172,133, and 5,821,283 and European Patent Applications 0 819 738 A and 0 826 752 A; various types of poly(ethylene oxide) condensates such as those disclosed in U.S. Pat. No. 5,837,043 and sulphate or phosphate esters thereof such as those disclosed in European Patent Application 0 848 045 A and U.S. Pat. Nos. 4,872,916 and 5,707,433; and surfactants such as sodium or potassium N-methyl-N-oleyl taurate as disclosed in U.S. Pat. Nos. 5,651,813 and 5,985,017 or a sarcosinate compound as described in British Patent Application 2 348 433 A. It is also possible to use mixtures of such dispersants.

A preferred dispersant according to this aspect of the invention is a copolymer of styrene with acrylic or methacrylic acids, together with optionally additional vinylically unsaturated comonomers such as acrylate esters. Preferably this dispersant is characterized by an acid number of between about 150 and about 250, a glass transition temperature between about 70° C. and about 90° C., and a molecular weight of between about 2000 and about 10000, and most preferably the acid number is between 150 and 200 and the molecular weight is about 5000. Many suitable styrene acrylate dispersants are commercially available, and a particularly useful example has an average molecular weight of between 2000 and 6000, a Tg of 70° and an acid number of 190.

Such styrene acrylate copolymer dispersants are either supplied commercially in the form of concentrated solutions in aqueous base, or are supplied as solids which are to be dissolved in water in the presence of a base. Suitable bases for dissolving such dispersants include sodium or potassium hydroxide, ammonia, or an organic amine base such as ethanolamine, triethanolamine, 2-amino-2-methyl-1-propanol, or 1-(dimethylamino)-2-propanol. It is also possible to use mixtures of such bases to dissolve the styrene acrylate copolymer.

Certain commercially available blends of anionic and non-ionic surfactants are also preferred for the inks of the inventive ink set.

It is preferred to prepare inks by dispersing the pigment in the presence of at least one dispersant or surfactant in deionised water to provide a dispersion, and then to dilute this dispersion to form the ink by adding additional water together with the organic cosolvents and any other additives. The dispersing step may be accomplished using one of several well known techniques, for example in a horizontal mini mill, a ball mill, an attritor, or by passing the mixture through a plurality of nozzles within a liquid jet interaction chamber at a liquid pressure of at least 1000 psi as described in U.S. Pat. No. 5,026,427 to produce a uniform dispersion of the pigment particles.

The concentration of the pigment in each ink is preferably between about 1% and about 8%. The particle diameter of the pigment is preferably 10 $\mu$m or less, particularly preferably 1 $\mu$m or less.

Each ink may contain up to about 400% by weight of the dispersant on the pigment, but preferably in the range 1 to 100% by weight on pigment, and most preferably approximately 10 to 50% by weight on pigment for most ink jet applications The inks of the invention are highly stable, print well, and give printed images of high quality and good color balance which are resistant to fading in light and do not give rise to noticeable changes in color balance on exposure.

An additional advantage is that the.yellow pigments do not need to be prepared from benzidine raw materials.

Figure 2:
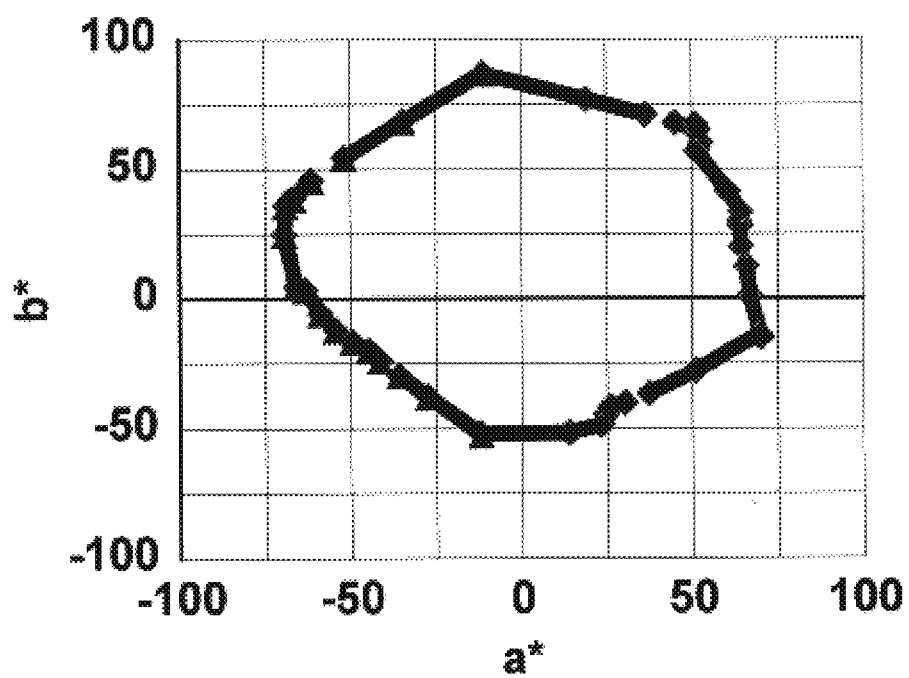
FIG. 2 illustrates the color gamut plot of the ink set according to the invention as described in Example 1.

In the attached figures, FIG. 1 shows the color gamut plot of the comparative ink set from Example 1 and FIG. 2 shows the color gamut plot of the inventive ink set from Example 1.

The following example will serve to illustrate the invention. This example is merely representative and is not inclusive of all the possible embodiments of the invention.

EXAMPLE 1

A comparative ink set was prepared as follows:

Preparation of Pigment Dispersions

Magenta, cyan and yellow pigment dispersions according to the compositions shown in Table 1 were prepared using a Microfluidiser Model 110Y at 12000 psi. The dispersions were then centrifuged at 3000 rpm for 20 minutes to remove oversized particles. The dispersant used with the magenta and cyan pigments was a commercially available styrene acrylate copolymer having an acid number of 190, a Tg of 70° C. and an average molecular weight of 2000 to 6000 neutralized with potassium hydroxide. This dispersant is available from BF Goodrich under the trade name Carboset 1161. The dispersant used with the yellow pigment was a commercially available blend of anionic and non-ionic surfactants, available from Uniqema under the trade name Zephrym 3800.

TABLE 1

| Color | CI Pigment Type | % Pigment | % Dispersant |
|---|---|---|---|
| Yellow | Yellow 155 | 10 | 2.0 |
| Magenta | Red 122 | 10 | 1.5 |
| Cyan | Blue 15:3 | 10 | 2.5 |

The average particle size of the dispersions was less than 200 nm.

Preparation of Inks

Cyan, magenta and yellow inks were then prepared from these dispersions according to the formulations shown in Table 2. The pH of the inks was approximately 9.5.

TABLE 2

| | Amount Parts by Weight | | |
|---|---|---|---|
| Component | Cyan | Magenta | Yellow |
| Pigment Dispersion | 25 | 30 | 45 |
| Thiodiglycol | 7.5 | 10 | 10 |
| Urea | 10 | 5 | 5 |
| Polyethylene Glycol MW300 | 10 | 10 | 5 |
| Triethanolamine | 1 | 0.5 | 1.7 |
| Deionised Water to make | 100 | 100 | 100 |

An ink set, according to the invention was prepared as follows:

Preparation of Pigment Dispersion

Cyan, magenta and yellow pigment dispersions were prepared in the same manner and with the compositions shown in Table 1. Orange and green pigment dispersions according to the compositions shown in Table 3 were prepared using a Microfluidiser Model 110Y at 1200 psi. The dispersions were then centrifuged at 300 rpm for 20 minutes to remove oversized particles. The dispersant used was a commercially available blend of anionic and non-ionic surfactants, available from Uniqema under the trade name Zephrym 3800.

TABLE 3

| Color | CI Pigment Type | % Pigment | % Dispersant |
|---|---|---|---|
| Orange | Orange 43 | 10 | 2.0 |
| Green | Green 7 | 10 | 2.0 |

Preparation of Ink

The Cyan, magenta and yellow inks were prepared in the same manner and with the same compositions as in Table 2. The orange and green inks were prepared from the above dispersions according to the formulation shown in Table 4.

TABLE 4

| | Amount Parts by Weight | |
|---|---|---|
| Component | Orange | Green |
| Pigment Dispersion | 30 | 30 |
| Thiodiglycol | 10 | 10 |
| Urea | 5 | 5 |
| Polyethylene Glycol MW300 | 10 | 10 |
| Deionised Water | 100 | 100 |
| Triethanolamine to adjust pH to | 8.2 | 8.1 |

The two ink sets were loaded into an Encad Novajet III Inkjet printer. Test charts were printed on ILFORD Ilfojet UMBP6 inkjet paper. All inks printed successfully and produced excellent image quality. In addition, the inks of the inventive set were found to show excellent decap properties. The prints were subjected to the following tests:

Color Gamut

100% density color patches composed of primary colors and a range of secondary colors were measured using a Gretag Spectrolino reflectance calorimeter. (CIELAB colorimetry values L* a* b* using D56 illuminant and 2° Standard Observer). The a* and b* values are plotted on the attached Figures, in which a* is a measure of color on the green/red axis and b* a measure of color on the blue/yellow axis, more saturated colors being shown as values of greater magnitude. The results for the comparative ink set are shown in the attached FIG. 1 and those for the inventive ink set are shown in FIG. 2. It is clear from a visual inspection of FIGS. 1 and 2 that the ink set of the invention covers a greater area of color space than does the comparative ink set. Hence color rendition using the inventive ink set including orange and green inks is less limited than that of the comparative ink set restricted to cyan, magenta and yellow inks.

Lightfastness

Lightfastness of the inks was measured according to ANSI IT9.9-1990 Method 5.9. 100% density patches of each ink: cyan, magenta, yellow, green and orange were printed on ILFORD Ilfojet XTUIV5 self-adhesive vinyl. The prints were exposed in an Atlas Ci4000 Weatherometer for 120 hours, tested and then exposed for a further 360 hours before testing again. The color of the prints before and after these exposures was measured using a Gretag Spectrolino and expressed in terms of the L* a* b* color system. The change in color on exposure, ΔE, was calculated from the following equation:

$$\Delta E = [(\Delta L^*)^2 + (\Delta a^*)^2 + (\Delta b^*)^2]^{1/2}$$

Using this; method, a lightfast material will exhibit a low value of ΔE and materials that fade at the same rate will have similar values of ΔE. Some indication of the ΔE value to be expected from a lightfast ink can be gained from U.S. Pat. No. 6,043,297, in which ΔE values of less than 10 are taken to indicate lightfastness. The results are summarized in Table 5.

TABLE 5

| Ink | ΔE | |
|---|---|---|
| | 120h | 480h |
| Cyan | 0.9 | 1.1 |
| Magenta | 3.3 | 3.5 |
| Yellow | 1.8 | 3.5 |
| Orange | 5.6 | 6.4 |
| Green | 0.9 | 1.1 |

It is seen that the degree of fading during the test for all five colors is well within the criterion for a lightfast ink used in U.S. Pat. No. 6,043,297 and that what little fading occurs during exposure does so at a uniform rate across the five colors. Hence no large changes in the color balance of an image arise during fading.

This example thus shows that the inventive ink set provides a large color gamut on printing and that the resulting prints show excellent light stability without developing any gross color imbalance on exposure to light.

The foregoing description of various and preferred embodiments of the present invention has been provided for purpose of illustration only, and it is understood that the numerous modifications, variations and alterations may be made without departing from the scope and spirit of the invention as defined in the appended claims hereto.

What is claimed is:

1. A pigmented aqueous ink set which comprises:
   (a) a cyan ink which comprises at least one pigment which is a phthalocyanine compound;
   (b) a magenta ink which comprises at least one pigment which is a quinacridone compound;
   (c) a yellow ink wherein the pigment is C.I. Pigment Yellow 155;
   (d) a green ink wherein the pigment is selected from the group consisting of C.I. Pigment Green 7, 36, and mixtures thereof; and
   (e) an orange ink wherein the pigment is selected from group consisting of C.I. Pigment Orange 34, 36, 43, 61, 64, 71, and mixtures thereof.

2. The ink set according to claim 1, further comprising:
   (f) a black ink which comprises a black pigment.

3. The ink set according to claim 1 wherein said phthalocyanine pigment comprises C.I. Pigment Blue 15:3 or Pigment Blue 15:4.

4. The ink set according to claim 1 wherein said quinacridone pigment comprises C.I. Pigment Red 122.

5. The ink set according to claim 1 wherein said orange pigment comprises C.I. Pigment Orange 43.

6. The ink set according to claim 1 wherein said orange pigment comprises C.I. Pigment Orange 71.

7. The ink set according to claim 2 wherein said black pigment is Carbon Black.

8. The ink set according to claim 1 wherein there is present in each of the inks at least one dispersant.

9. The ink set according to claim 8 wherein said dispersant in at least one of the inks is a styrene acrylate copolymer characterized by an acid number of between about 150 and about 250, a glass transition temperature between about 70° C. and about 90° C., and an average molecular weight of between about 2000 and about 10000.

10. The ink set according to claim 9 wherein the dispersant comprises a styrene acrylate copolymer having an acid number of 190, a Tg of 70° C. and an average molecular weight of 2000 to 6000.

11. The ink set according to claim 8 wherein the dispersant in at least one of the inks comprises a mixture of nonionic and anionic surfactants.

12. The ink set according to claim 1 wherein the aqueous carrier medium comprises a combination of water together with at least one water miscible organic cosolvent.

13. The ink set according to claim 12 wherein said water miscible organic solvent is present in a proportion of less than about 25% by weight.

14. A pigmented aqueous ink set which comprises:
   (a) a cyan ink which comprises at least one pigment which is a phthalocyanine compound;
   (b) a magenta ink which comprises at least one pigment which is a quinacridone compound;
   (c) a yellow ink wherein the pigment is C.I. Pigment Yellow 155;
   (d) a green ink wherein the pigment is selected from the group consisting of C.I. Pigment Green 7, 36, and mixtures thereof; and
   (e) an orange ink wherein the pigment is Pigment Orange 71.

* * * * *

UNITED STATES PATENT AND TRADEMARK OFFICE
CERTIFICATE OF CORRECTION

PATENT NO.     : 6,530,986 B2
DATED          : March 11, 2003
INVENTOR(S)    : Walker et al.

It is certified that error appears in the above-identified patent and that said Letters Patent is hereby corrected as shown below:

Column 3,
Lines 30-31 delete "trinmethylol" and insert -- trimethylol --.

Column 5,
Line 63, delete "300 rpm" and insert -- 3000 rpm --.

Column 6,
Line 37, delete "calorimeter" and insert -- colorimeter --.

Signed and Sealed this

Twenty-ninth Day of July, 2003

JAMES E. ROGAN
*Director of the United States Patent and Trademark Office*